(12) United States Patent
Nair et al.

(10) Patent No.: US 7,148,941 B2
(45) Date of Patent: Dec. 12, 2006

(54) COMPENSATOR WITH PHOTOCHEMICALLY CURED BARRIER LAYER AND PROCESS

(75) Inventors: Mridula Nair, Penfield, NY (US); Tamara K. Jones, Rochester, NY (US); Bradley M. Houghtaling, Rochester, NY (US); Jeffrey A. Trest, Pittsford, NY (US); Joseph S. Sedita, Albion, NY (US)

(73) Assignee: Eastman Kodak Company, Rochester, NY (US)

( * ) Notice: Subject to any disclaimer, the term of this patent is extended or adjusted under 35 U.S.C. 154(b) by 203 days.

(21) Appl. No.: 10/390,123

(22) Filed: Mar. 17, 2003

(65) Prior Publication Data

US 2004/0075796 A1   Apr. 22, 2004

Related U.S. Application Data

(63) Continuation-in-part of application No. 10/272,775, filed on Oct. 17, 2002, now abandoned.

(51) Int. Cl.
   *G02F 1/1335* (2006.01)
(52) U.S. Cl. .................. 349/117; 349/122; 428/1.1
(58) Field of Classification Search ........ 349/117–122; 428/1.1
   See application file for complete search history.

(56) References Cited

U.S. PATENT DOCUMENTS

| 4,072,769 A | * | 2/1978 | Lidel ................... 427/561 |
| 4,927,689 A | * | 5/1990 | Markiewicz ............ 428/34.8 |
| 5,583,679 A | * | 12/1996 | Ito et al. ............... 349/118 |
| 5,619,352 A | * | 4/1997 | Koch et al. ............. 349/89 |
| 5,731,886 A | * | 3/1998 | Taber et al. ............ 359/291 |
| 5,880,800 A | * | 3/1999 | Mikura et al. .......... 349/122 |
| 5,943,110 A | * | 8/1999 | Yoda et al. ............. 349/134 |
| 6,025,900 A | * | 2/2000 | Yoon et al. ............. 349/124 |
| 6,559,915 B1 | * | 5/2003 | Amimori et al. ........ 349/112 |
| 6,603,085 B1 | * | 8/2003 | Oya et al. .............. 200/512 |
| 2002/0041352 A1 | | 4/2002 | Kuzuhara et al. |
| 2002/0063827 A1 | * | 5/2002 | Wu ..................... 349/117 |
| 2002/0063828 A1 | * | 5/2002 | Negoro et al. .......... 349/117 |
| 2002/0102368 A1 | | 8/2002 | Ono et al. |
| 2003/0067572 A1 | * | 4/2003 | Umeda et al. .......... 349/117 |
| 2004/0001175 A1 | * | 1/2004 | Ito ..................... 349/117 |

FOREIGN PATENT DOCUMENTS

| EP | 1 143 271 | 10/2001 |
| JP | 2002 014233 | 1/2002 |

\* cited by examiner

*Primary Examiner*—Andrew Schechter
*Assistant Examiner*—George Y. Wang
(74) *Attorney, Agent, or Firm*—Arthur E. Kluegel

(57) ABSTRACT

Disclosed is an optical compensator for a liquid crystal display having improved optical properties, comprising a transparent polymeric support bearing an orientation layer and a photochemically cured optically anisotropic layer, in that order, wherein a photochemically cured barrier layer is present between the orientation layer and the support, and wherein the barrier layer, as disposed on the support, exhibits an indentation modulus of less than 2 GPa. The invention further provides a compensator comprising a transparent polymeric support, an orientation layer, and a photochemically cured optically anisotropic layer, in that order, wherein a photochemically cured barrier layer is present between the orientation layer and the support, and wherein there is present a compliant layer softer than the barrier layer adjacent to the support side of the barrier layer, and further comprises a compensator containing two or more compensator layers, with or without an adjacent compliant layer and a process for making the foregoing.

40 Claims, 4 Drawing Sheets

COMPENSATOR WITH PHOTOCHEMICALLY CURED BARRIER LAYER AND PROCESS

CROSS-REFERENCE TO RELATED APPLICATIONS

This application is a Continuation-in-Part of U.S. patent application Ser. No. 10/272,775 filed Oct. 17, 2002 now abandoned, the contents of which are incorporated herein by reference. This application is related to commonly assigned U.S. patent application Ser. No. 10/194,162 filed Jul. 12, 2002 by M. Nair et al. and U.S. patent application Ser. No. 10/194,130 filed Jul. 12, 2002 by C. L. Bauer et al. the contents of which are incorporated herein by reference.

FIELD OF THE INVENTION

The present invention relates to an optical compensator film for a liquid crystal display comprising a transparent support, an orientation layer, and an optically anisotropic layer, in that order, in which a photochemically cured barrier layer is located between the orientation layer and the support.

BACKGROUND OF THE INVENTION

A typical liquid crystal display comprises a liquid crystal element or cell, a polarizing sheet and an optical compensator (phase retarder) provided between the liquid crystal cell and the polarizing sheet.

Current rapid expansion in the liquid crystal display (LCD) applications in various areas of information display is largely due to improvements of display qualities. Contrast, color reproduction, and stable gray scale intensities are important quality attributes for electronic displays, which employ liquid crystal technology. The primary factor limiting the contrast of a liquid crystal display is the propensity for light to "leak" through liquid crystal elements or cells, which are in the dark or "black" pixel state. Furthermore, the leakage and hence contrast of a liquid crystal display are also dependent on the angle from which the display screen is viewed. Typically the optimum contrast is observed only within a narrow viewing angle centered about the normal incidence to the display and falls off rapidly as the viewing angle is increased. In color displays, the leakage problem not only degrades the contrast but also causes color or hue shifts with an associated degradation of color reproduction. In addition to black-state light leakage, the narrow viewing angle problem in typical twisted nematic liquid crystal displays is exacerbated by a shift in the brightness-voltage curve as a function of viewing angle because of the optical anisotropy of the liquid crystal material.

Thus, one of the major factors measuring the quality of such displays is the viewing angle characteristic, which describes a change in contrast ratio from different viewing angles. It is desirable to be able to see the same image from a wide variation in viewing angles and this ability has been a shortcoming with liquid crystal display devices. One way to improve the viewing angle characteristic is to insert a compensator (also referred as compensation film, retardation film, or retarder) with proper optical properties between the polarizer and liquid crystal cell, such as disclosed in U.S. Pat. No. 5,583,679 (Ito et al.), U.S. Pat. No. 5,853,801 (Suga et al.), U.S. Pat. No. 5,619,352 (Koch et al.), U.S. Pat. No. 5,978,055 (Van De Witte et al.), and U.S. Pat. No. 6,160,597 (Schadt et al.). A compensation film according to U.S. Pat. No. 5,583,679 (Ito et al.) and U.S. Pat. No. 5,853,801 (Suga et al.), based on discotic liquid crystals which have negative birefringence, is widely used. It offers improved contrast over wider viewing angles. However, it suffers larger color shift for gray level images, compared to a compensator made of liquid crystalline materials with positive birefringence, according to Satoh et al. ("Comparison of nematic hybrid and discotic hybrid films as viewing angle compensator for NW-TN-LCDs", SID 2000 Digest, pp. 347–349, (2000)). To achieve comparable performance in the contrast ratio while reducing color shift, one alternative is to use a pair of crossed liquid crystal polymer (LCP) films on each side of liquid crystal cell, as discussed by Chen et al. ("Wide Viewing Angle Photoaligned Plastic Films", SID 99 Digest, pp. 98–101 (1999)). This paper states that "since the second LPP/LCP retarder film is coated directly on top of the first LCP retarder film, the total thickness of the final wide-view retarder stack is only a few microns thin". Although they provide very compact optical component, one of the challenges of this method is to make two LCP layers crossed, particularly in a continuous roll to roll manufacturing process.

In a liquid crystal cell comprising a pair of substrates, a rod-like liquid crystal compound and an electrode layer, the rod-like liquid crystal compound is provided between the substrates. The electrode layer has a function of applying a voltage to the rod-like liquid crystal compound. Each of the substrates has an orientation layer (both-sided orientation layers), which has a function of aligning the rod-like liquid crystal compound. The orientation layer of the liquid crystal cell is usually prepared by forming a polymer (e.g., polyimide, polyvinyl alcohol) membrane on the substrate, and rubbing the membrane with a cloth uniformly.

The alignment of the liquid crystal molecules using a linearly photopolymerizable polymer (LPP) is an alternate method that can improve yield and cost of LCDs. An LPP layer is applied to the surfaces of the LCD substrates and optically aligned, thereby generating the required alignment and bias tilt angle for the liquid crystal molecules in the display. This process replaces the mechanical brushing of the polyimide layer described above that is used in the industry today, and offers a number of distinct advantages. Alignment of the liquid crystals can be in more than one direction within the display. Hence, single or multi-domain pixel structures with sub-micron resolution can be generated, resulting, for example, in novel displays with in-built temperature independent viewing angle compensation. Optical alignment is a non-mechanical, non-contact process, which does not generate dust particles or electrostatic charge, which can damage the TFT's and reduce the yield. Furthermore, the process can be integrated into the manufacturing line and offers the possibility to reduce the overall manufacturing cost. The LPP materials are easy to apply, using conventional coating techniques such as printing or spin-coating. Application can also be carried out on a continuous, roll-to-roll web onto flexible polymer substrates, for use in the manufacture of plastic LCD's. By applying a thin film of an LCP material on top of the LPP layer, and by combining various LPP/LCP layers, as discussed earlier, a wide range of new optically anisotropic solid-state thin-film devices can be created. By varying the composition of the LCP layers, the characteristics of the resultant film (e.g. anisotropy, dispersion, transmission) can be adjusted to suit the end use. Specific design of the formulation of the LCP mixture can also generate the required operating temperature for the manufacture of the films. The resultant effects can be applied to a wide variety of optical displays and devices, giving rise to performance improvements and the generation of new devices.

U.S. Pat. No. 5,583,679, U.S. Pat. No. 6,061,113, and U.S. Pat. No. 6,081,312 describe the use of subbing or undercoat layers to improve the adhesion of an alignment layer and an optically anisotropic layer comprising a discotic liquid crystal material to the support.

It has been desired to provide an optical compensator that widens the viewing angle characteristics of liquid crystal displays, in particular Twisted Nematic (TN), Super Twisted Nematic (STN), Optically Compensated Bend (OCB), In Plane Switching (IPS), or Vertically Aligned (VA) liquid crystal displays, and is readily manufactured, does not cause unwanted curl of the support and improves the ability of the LPP to align. These various liquid crystal display technologies have been reviewed in U.S. Pat. No. 5,619,352 (Koch et al.), U.S. Pat. No. 5,410,422 (Bos), and U.S. Pat. No. 4,701,028 (Clerc et al.).

The ability to provide the orientation layer at the point of manufacture of the plastic support is a highly desired feature. However, in order to accomplish this feature, the orientation layer should be impermeable to the components of the support, such as plasticizers, UV stabilizers, low molecular weight polymers derived from the support polymer and other additives. This becomes particularly challenging when the LPP layer is coated from an essentially all organic solvent. Such solvents are typically used in high speed film support manufacturing. Typically the LPP layer is extremely thin (under 3 microns) and at the same time functions as the orientation layer for the subsequent LCP layer. Thus, quality of the layer is especially critical and must not adversely affect the optical alignment of the layer since the orientation of the LCP is dependent on efficient orientation of the LPP layer. Contaminants can adversely affect the alignment process.

U.S. Pat. Nos. 6,061,113 and 6,081,312 teach compensator plates for liquid crystal cells but do not provide the desired protection from the migration of support components in the case of polymeric supports. U.S. Pat. No. 5,583,679 also teaches the use of a hardened gelatin layer as a second subbing layer to promote adhesion of the optical alignment layers to the support but no mention is made of the migration of contaminants from the support to the orientation layer.

Commonly assigned patent application USSN (docket 84732) describes a thermal or radiation cured barrier layer impermeable to the components of the support, that is applied to the transparent polymeric support prior to applying the photochemically(UV) cured optical layers. Although the thermally cured barrier exemplified prevents migration of contaminants from the support to the orientation layer, it tends to compromise the optical quality of the multilayer structure. Stress fracturing and adhesion of the subsequently applied layers are problems. It is believed that the lower molecular weight reactive monomers in the anisotropic layer have high entropy. As the photochemical UV curing proceeds, the molecules are slowed down and the film layer shrinks, building in internal stresses and reducing the film to substrate interaction. This results in poor adhesion of the optical layers to the barrier layer and causes the multilayer LPP/LCP structure to develop stress cracks as the layers are built up. These are completely unsatisfactory properties for optical components.

It is a problem to be solved to provide a compensator that employs a barrier layer but exhibits little or no stress cracking or other non-uniformity and preferably exhibits improved adhesion between the barrier layer and the overlying optical layers, thereby providing improved optical properties.

SUMMARY OF THE INVENTION

The present invention provides an optical compensator for a liquid crystal display comprising a transparent polymeric support bearing an orientation layer and a photochemically cured optically anisotropic layer, in that order, wherein a photochemically cured barrier layer is present between the orientation layer and the support, and wherein the barrier layer, as disposed on the support, exhibits an indentation modulus of less than 2 GPa. The invention further provides a compensator containing a compliant layer and a compensator containinging two or more compensator layers, with or without an adjacent compliant layer. The invention also provides a process for the preparation of the optical compensator and a liquid crystal display and an electronic imaging device using the optical compensator.

The invention also encompasses an optical compensator for a liquid crystal display comprising a transparent polymeric support, an orientation layer, and a photochemically cured optically anisotropic layer, in that order, wherein a photochemically cured barrier layer is present between the orientation layer and the support, and wherein there is present a compliant layer softer than the barrier layer adjacent to the support side of the barrier layer, and further encompasses an optical compensator for a liquid crystal display comprising a transparent polymeric support, two combinations of an orientation layer and a photochemically cured optically anisotropic layer, in that order from the support, wherein a photochemically cured barrier layer is present adjacent to each orientation layer on the support side.

The optical compensator exhibits improved optical properties.

DETAILED DESCRIPTION OF THE INVENTION

Figure 1:
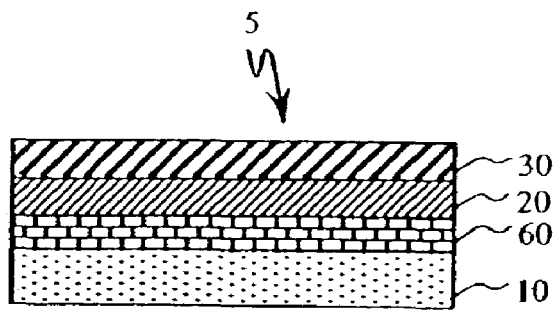
FIG. 1 is a cross-sectional schematic view of a compensator of the present invention.

The invention is described above. As used herein the term "impermeable" when applied to a layer means that the layer substantially impedes the passage of components in the support layer from passing into the orientation (LPP) layer.

The current invention regarding the optical compensator for liquid crystal displays is described by referring to the drawings as follows.

FIG. 1 shows a cross-sectional schematic view of an optical compensator 5 according to the present invention. This compensator comprises a substrate 10 of transparent material, such as a polymer. It should be understood that to be called as a substrate, a layer must be solid and mechanically strong so that it can stand alone and support other layers. A typical substrate is made of triacetate cellulose (TAC), polyester, polycarbonate, polysulfone, polyether sulfone, cellophane, aromatic polyamide, polyethylene, polypropylene, polyvinyl alcohol, or other transparent polymers, and has a thickness of 25 to 500 micrometers. Substrate 10 typically has low in-plane retardation, preferably less than 10 nm, and more preferably less than 5 nm. In some other cases, the substrate 10 may have larger in-plane retardation between 15 to 150 nm. Typically, when the substrate 10 is made of triacetyl cellulose, it has out-of-plane retardation around −40 nm to −120 nm. This is a desired property when the compensator is designed to compensate a liquid crystal state with an ON voltage applied. The in-plane retardation discussed above is defined as the absolute value of $(n_x-n_y)d$ and the out-of-plane retardation discussed above is defined as $[n_z-(n_x+n_y)/2]d$, respectively. The refractive indices $n_x$ and $n_y$ are along the slow and fast axes in plane of the substrate, respectively, $n_z$ is the refractive index along the substrate thickness direction (Z-axis), and d is the substrate thickness. The substrate is preferably in the form of a continuous (rolled) film or web. The surface of the substrate may be subjected to surface activating treatments in order to facilitate adhesion of the layer coated over it. Such surface activating treatments may include corona discharge treatment, flame treatment, UV treatment, high frequency treatment, glow discharge treatment, active plasma treatment, laser treatment and ozone oxidation treatment. Surface activation may also be facilitated by coating an adhesion promoting primer layer over the substrate. Further, layers coated on the substrate may also be subjected to such surface activating treatment to improve subsequent coatability and adhesion at the desired surfaces and interfaces.

On the substrate 10, a photochemically cured barrier layer 60 is applied, an orientation layer 20 is disposed on top of layer 60, and an anisotropic liquid crystal layer 30 is disposed on top of layer 20.

While this type of compensator described above provides some desired optical properties, it is not sufficient in many applications, for example, as a compensator for Twisted Nematic (TN) Liquid Crystal Displays (LCDs).

Figure 2A:
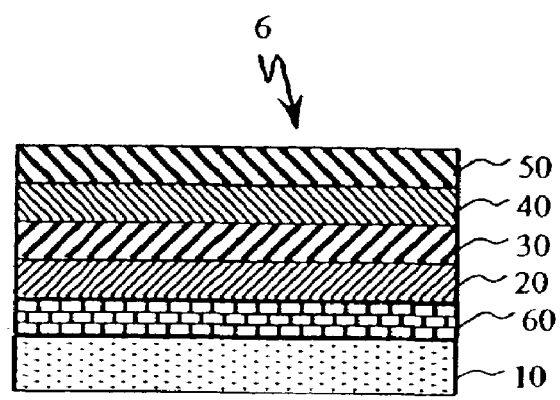
FIGS. 2A and 2B are cross-sectional schematic views of various embodiments of the present invention.

FIG. 2A illustrates a more sophisticated optical compensator 6 of the invention that contains a second orientation layer 40 and a second anisotropic layer 50 on top of the first anisotropic layer 30. The second orientation layer 40 and the second anisotropic layer 50 are made essentially in the same way as the first orientation layer 20 and the first anisotropic layer 30 are made, except that the direction of the orientation may vary.

Figure 3:
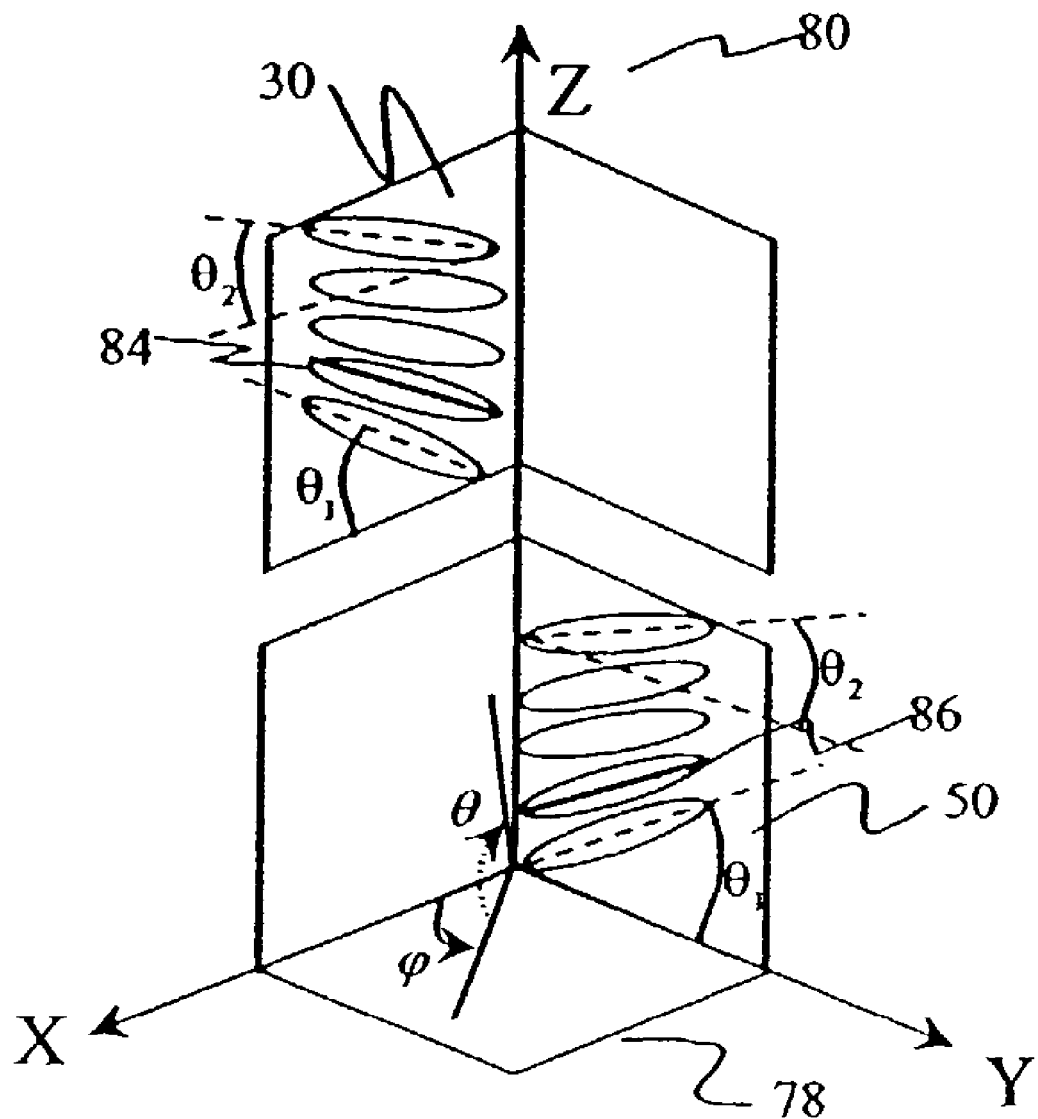
FIG. 3 is a schematic concept in accordance with the present invention.

FIG. 3 shows an XYZ coordinate system 80 for the purpose of illustration. The X and Y axes are parallel to the plane of substrate 78, and the Z-axis is perpendicular to the plane of substrate 78. The angle $\phi$ is measured from the X-axis in the XY plane, and referred as an azimuthal angle. The angle $\theta$ is measured from the XY plane, and referred as a tilt angle. It should be understood that the optic axis in each of the anisotropic layers 30 and 50 can have a variable tilt angle and/or variable azimuthal angle. For example, the optic axis 84 in the anisotropic layer 30 has a variable tilt angle $\theta$ across the Z-axis ranging from $\theta_1$ to $\theta_2$. In another example, the optic axis 84 has a fixed tilt angle $\theta$ across the Z-axis, namely, $\theta_1=\theta_2$. In another example, the optic axis 84 is contained in one plane such as the XZ plane and consequently has a fixed azimuthal angle $\phi$ across the Z-axis. In another example, although the anisotropic layer 30 is still oriented along the preferred direction forced by the orientation layer at their interface, the optic axis 84 has a variable azimuthal angle $\phi$ across the Z-axis. The azimuthal angle of the optic axis 84 can be varied by adding a proper amount of chiral dopant into the anisotropic layer 30. In another example, the optic axis 84 has a variable tilt angle $\theta$ and a variable azimuthal angle $\phi$ across the Z-axis. Like the optic axis 84 of the anisotropic layer 30, the optic axis 86 of the anisotropic layer 50 can also have a fixed tilt angle, a variable tilt angle, a fixed azimuthal angle, a variable azimuthal angle, or a variable tilt angle and a variable azimuthal angle across the Z-axis. The anisotropic layers 30 and 50 typically have different optic axis. Preferably the anisotropic layer 30 is positioned orthogonally relative to the respective optic axis of the anisotropic layer 50 about an axis perpendicular to the plane of the substrate. Even though the optic axis of the anisotropic layer 30 is preferred to be orthogonal (or ±90 degrees) relative to the respective (or counterpart) optic axis of the anisotropic layer 50 about an axis perpendicular to the plane of the substrate, it should be understood that the angle between the optic axis of the two anisotropic layers can be in a range of 85 to 95 degrees to be considered as orthogonal.

For the manufacture of more complex layer structures than that illustrated in FIG. 2A, additional orientation and anisotropic layers can be applied in further steps.

Figure 2B:
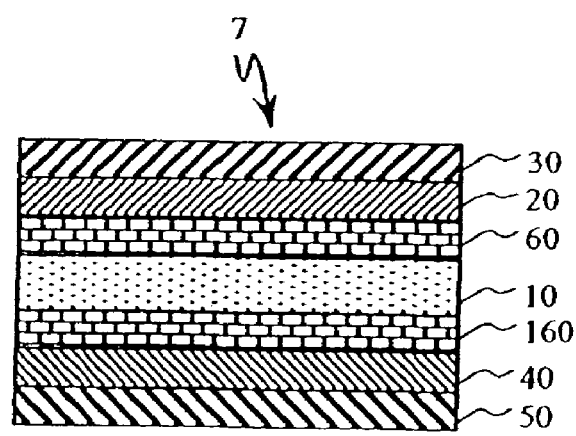

FIG. 2B illustrates another optical compensator 7 of the invention in which the second orientation layer 40 and the second anisotropic layer 50 are on the opposite side of the substrate from the first orientation layer 20 and the first anisotropic layer 30 and a second barrier layer 160 is employed.

Figure 2C:
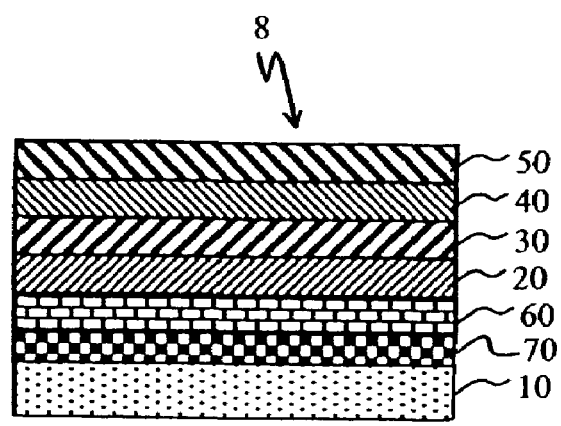
FIG. 2C is a cross-sectional schematic view showing the compensator of the invention incorporating a compliant layer useful in the invention.

FIG. 2C illustrates another optical compensator 8 of the invention similar to that of FIG. 2A but having a compliant layer 70 located between the support 10 and the photochemically cured barrier layer 60. The compensator contains a second orientation layer 40 and a second anisotropic layer 50 on top of the first anisotropic layer 30. The second orientation layer 40 and the second anisotropic layer 50 are made essentially in the same way as the first orientation layer 20 and the first anisotropic layer 30 are made, except that the direction of the orientation may vary. Selection of the appropriate barrier layer and use of the desirable compliant layer 70 serves to improve adhesion of the optical layers and to reduce stress cracking, especially in layers 40 and 50.

Figure 4:
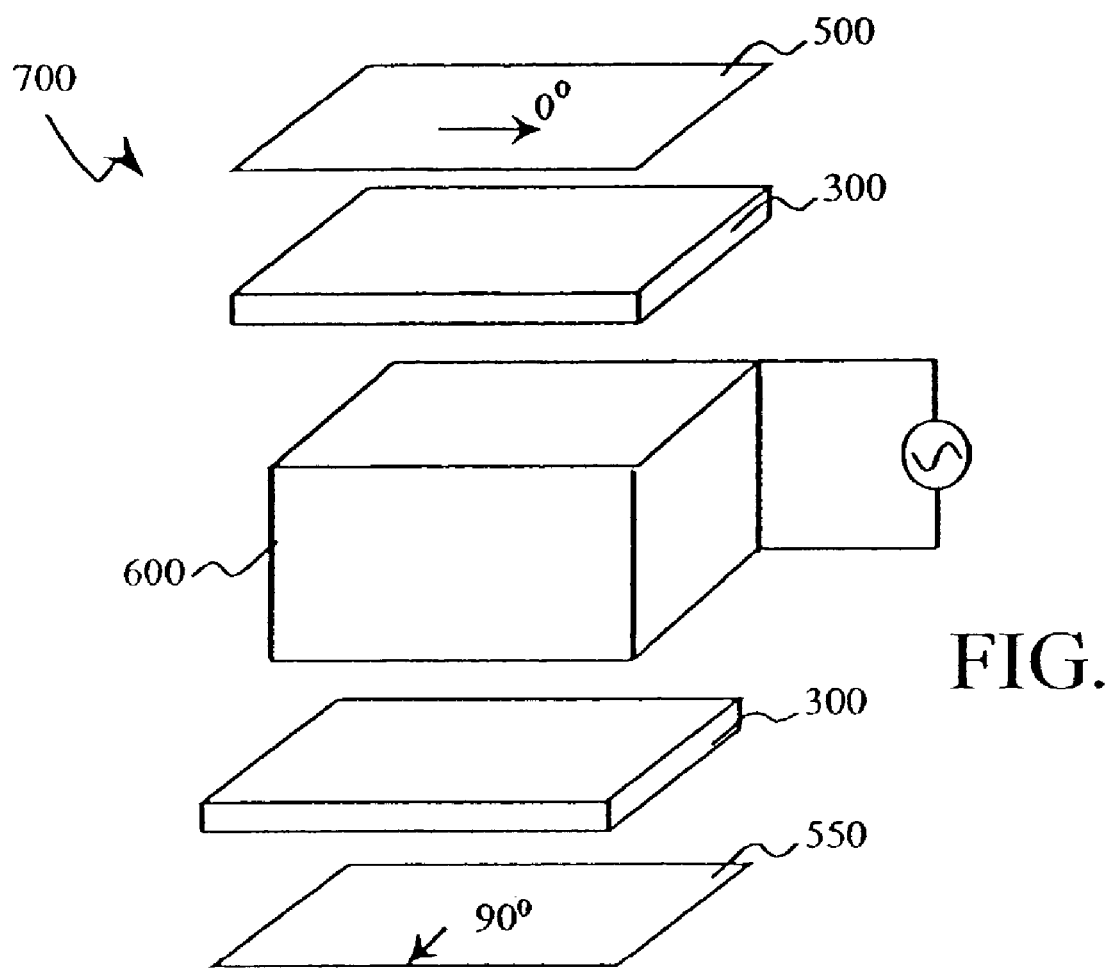
FIG. 4 shows a liquid crystal display in combination with a compensator according to the present invention.

FIG. 4 is a schematic view of a liquid crystal display 700 comprising the compensator 300 in accordance with the present invention. In FIG. 4B, one compensator 300 is placed between the first polarizer 500 and the liquid crystal cell 600, and another compensator 300 is placed between a second polarizer 550 and the liquid crystal cell 600. The liquid crystal cell 600 is preferred to be operated in a Twisted Nematic (TN), Super Twisted Nematic (STN), Optically Compensated Bend (OCB), In Plane Switching (IPS), or Vertically Aligned (VA) mode. The polarizers 550 and 500 can be arranged crossed or parallel depending on the operation principles of the liquid crystal cell. The orientation layer in the compensator can be arranged parallel, perpendicular, or at a predetermined angle relative to the first polarizer 500. The liquid crystal cell can also be operated in a reflective mode, in which it may only require one polarizer.

Figure 5:
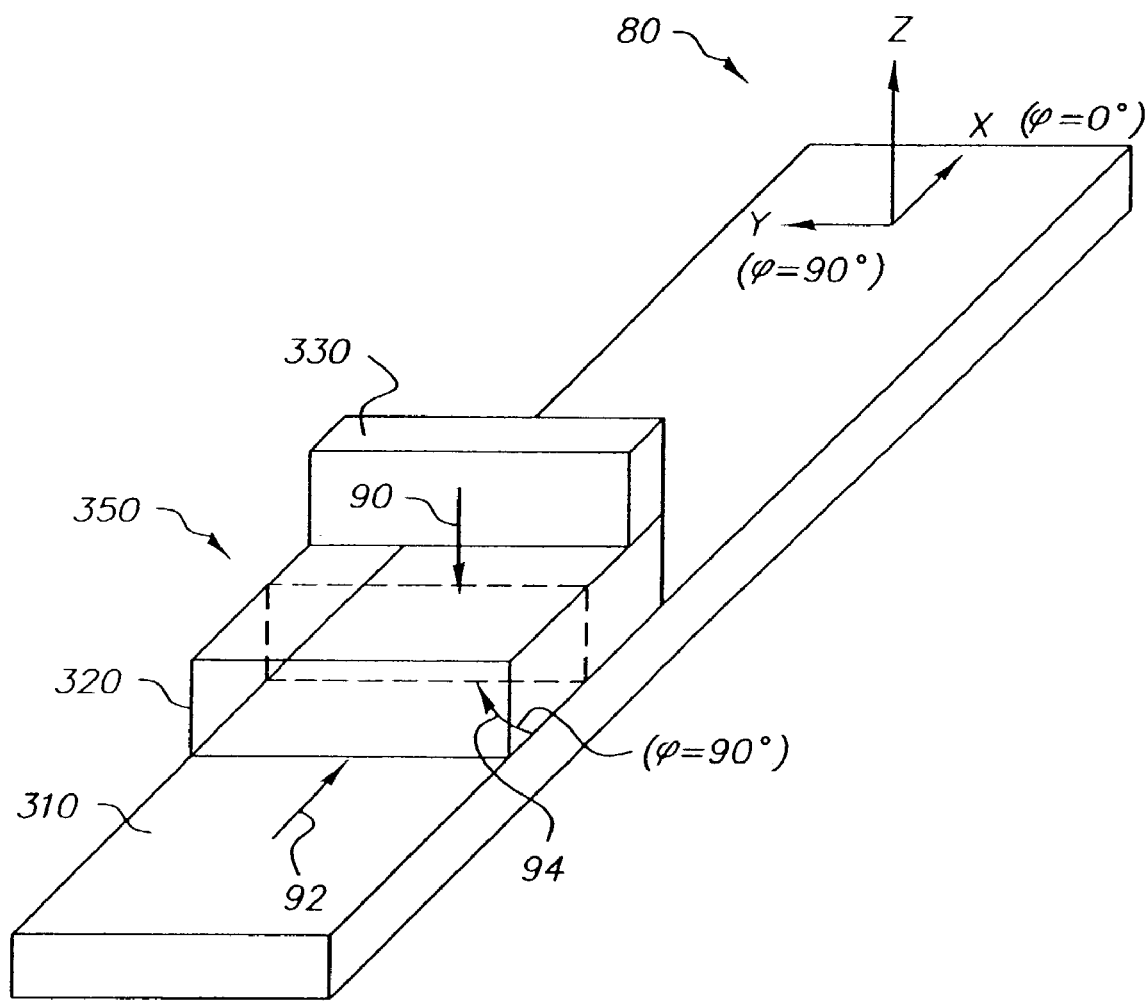
FIG. 5 shows a roll-to-roll process for making a compensator according to the present invention.

FIG. 5 shows another aspect of the present invention. A compensator 350 can be manufactured on a continuous roll-to-roll basis as shown in FIG. 5 which shows part of a schematic view of the process. The roll-to-roll process of forming a compensator 350 comprises the steps of applying a photo-alignable orientation layer 320, for example by coating by any known method such as gravure coating, extrusion hopper coating, roll-coating, slide hopper coating, or curtain coating, the orientable material in a solvent, onto a moving substrate 310, drying the orientation layer 320, photo-aligning (orienting) the orientation layer 320 in a predetermined alignment direction φ 94, (for the purpose of illustration φ=90°) relative to the roll moving direction 92, coating an anisotropic layer 330 comprising a polymerizable material in a solvent carrier onto the orientation layer 320, drying the anisotropic layer 330, polymerizing the anisotropic layer 330 to form a continuous web of compensator. Note that for clarity, FIG. 5 only shows part of the orientation layer 320 and anisotropic layer 330.

The orientation layer is aligned in a direction 94 of 90 degrees (φ=90°) relative to the roll moving direction 92 by a photo-alignment technique; for example, the orientation layer is exposed to a linearly polarized ultraviolet (UV) light indicated by 90. It may or may not be collimated, however, the projection (pointing along 94) of the principal ray of the light 90 onto the roll makes an angle of about 90 degrees relative to the roll moving direction.

Suitable barrier layers are those that are "impermeable" or substantially impede the passage of components in the support layer from passing into the orientation layer and do not by themselves poison the orientation layer as a result of their components. The barrier layer 60 of this invention comprises a photochemically cured polymer and as disposed on the support has an indentation modulus of less than 2 GPa. In a preferred embodiment, a compliant layer 70 is coated below the photochemically cured barrier layer, between the barrier layer and the support. By compliant layer is meant a layer that also has an indentation modulus of less than 2 GPa, preferably less than 1.7 GPa, as disposed on the support. Indentation modulus as defined in this invention is measured with a Hysitron nanoindenter equipped with a 2 micrometer radius, 60 degree conical diamond indenter in a layer less than 10 micrometers in thickness. Based on the experimental data, the use of structures with these mechanical property requirements reduces the propensity for cracking in layers applied through subsequent coating steps.

The barrier layer 60 comprises polymers that have been crosslinked using photochemical curing such as ultraviolet irradiation, and is preferably derived from lacquers such as monomers and oligomers or prepolymers of (meth)acrylate (the term "(meth)acrylate" used herein refers to acrylate and methacrylate) or the like of polyfunctional compounds, such as polyhydric alcohols and their derivatives having (meth)acrylate functional groups such as ethoxylated trimethylolpropane tri(meth)acrylate, tripropylene glycol di(meth)acrylate, trimethylolpropane tri(meth)acrylate, diethylene glycol di(meth)acrylate, pentaerythritol tri(meth)acrylate, dipentaerythritol hexa(meth)acrylate, 1,6-hexanediol di(meth)acrylate, or neopentyl glycol di(meth)acrylate and mixtures thereof and from relatively low-molecular weight polyester resin, polyether resin, acrylic resin, epoxy resin, urethane resin, urethane-acrylic resins, alkyd resin, spiroacetal resin, polybutadiene resin, and polythiol-polyene resin, and ionizing radiation-curable resins containing a relatively large amount of a reactive diluent. Reactive diluents usable herein include monofunctional monomers, such as ethyl (meth)acrylate, ethylhexyl (meth)acrylate, styrene, vinyltoluene, and N-vinylpyrrolidone, and polyfunctional monomers, for example, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, or neopentyl glycol di(meth)acrylate. Among others, in the present invention, conveniently used radiation curable lacquers include polyfunctional acrylic compounds derived from polyhydric alcohols and their derivatives such as mixtures of ethoxylated trimethylolpropane triacrylate and tripropylene glycol diacrylate and the like. An example of a lacquer that is conveniently used is SK3200 from Sony Chemical Corporation.

When the photochemically cured layer is ultraviolet-cured, a photo polymerization initiator is incorporated into the photochemically curable resin or lacquer composition. A photo polymerization initiator, such as an acetophenone compound, a benzophenone compound, Michler's benzoyl benzoate, α-amyloxime ester, or a thioxanthone compound and a photosensitizer such as n-butyl amine, triethylamine, or tri-n-butyl phosphine, or a mixture thereof is incorporated in the ultraviolet radiation curing composition. In the present invention, a conveniently used initiator is 2,2-dimethoxy-2-phenylacetophenone.

By photochemical curing is meant ultraviolet (UV) curing and involves the use of UV radiation of wavelengths between 280 and 420 nm preferably between 320 and 410 nm.

In an alternative embodiment, the invention comtemplates an optical compensator for a liquid crystal display comprising a transparent polymeric support, an orientation layer, and a photochemically cured optically anisotropic layer, in that order, wherein a photochemically cured barrier layer is present between the orientation layer and the support, and wherein there is present a compliant layer softer than the barrier layer adjacent to the support side of the barrier layer. In this embodiment, the compliant layer 70 that is coated below the photochemically cured layer 60 comprises urethane polymers that may be either organic solvent soluble or aqueous dispersible. For environmental reasons aqueous dispersible urethane polymers are preferred. Preparation of polyurethane dispersions is well known in the art and involves chain extending a prepolymer containing terminal isocyanate groups by reaction with a diamine or diol. The prepolymer is prepared by reacting a polyester, polyether, polycarbonate, or polyacrylate having terminal hydroxyl groups with excess polyfunctional isocyanate. This product is then treated with a compound that has functional groups that are reactive with an isocyanate, for example, hydroxyl groups, and optionally, a group that is capable of forming an anion, typically this is a carboxylic acid group. The anionic groups are then neutralized with a tertiary amine to form an aqueous polymer dispersion.

The compliant layer may optionally contain other diluent polymers such as poly(vinyl alcohol), poly(ethyloxazoline), poly(ethylene oxide) and the like.

Examples of urethane polymers useful in the present invention that are commercially available are NeoRez R600 and NeoRez R972 both from NeoResins (a division of Avecia) and Sancure 898 from BFGoodrich. These are aliphatic polyester based polyurethanes.

The compliant layer may optionally be crosslinked with polyfunctional compounds containing groups such as isocyanate groups, epoxy groups, aziridene groups, oxazoline groups, aldehyde groups, carbonyl groups, hydrazine groups, methanol groups and active methylene groups. Also, a vinylsulfonic acid, an acid anhydride, a cyanoacrylate derivative, an etherified methylol, an ester or a metal alkoxide such as urethane and tetramethoxysilane can be used to introduce the crosslinked structure. A functional group which exhibits the crosslinking property as a result of the decomposition reaction such as blocked isocyanate may also be used. The crosslinkable group for use in the present invention is not limited to these compounds but may be a group which exhibits reactivity after the decomposition of the above described functional groups. An example of a polyfunctional crosslinker useful in this invention is CX100, a trifunctional crosslinker, from NeoResins (a division of Avecia).

In addition the barrier layer 60 and the compliant layer 70 of this invention may also both or either one optionally comprise diluent polymers or resins such as polymethyl (meth)acrylates and other acrylic polymers, styrenic and other vinyl polymers, polyesters, polyurethanes, nitrile resins and the like.

In a further alternative embodiment, the optical compensator comprises a transparent polymeric support, two (or more) combinations of an orientation layer and a photochemically cured optically anisotropic layer, in that order from the support, wherein a photochemically cured barrier layer is present adjacent to each orientation layer on the support side. Especially where more than one orientation layer/anisotropic layer set is employed, it is useful to include more than one barrier layer to help prevent migration of components from the layer(s) underlying the orientation layer up to or through the orientation layer. It may be desirable to employ a compliant layer for any or all of the barrier layers.

Examples of solvents employable for coating the barrier layer 60 and the compliant layer 70 include polar solvents such as water, methanol, ethanol, n-propanol, isopropanol, and n-butanol, non polar solvents such as cyclohexane, heptane, toluene and xylene, alkyl halides such as dichloromethane and dichloropropane, esters such as methyl acetate, ethyl acetate, propyl acetate and butyl acetate, ketones such as acetone, methyl isobutyl ketone, methyl ethyl ketone, γ-butyrolactone and cyclopentanone, cyclohexanone, ethers such as tetrahydrofuran and 1,2 dimethoxyethane, or mixtures thereof. With the proper choice of solvent, adhesion between the transparent plastic substrate film and the coating resin can be improved while the surface of the transparent plastic substrate film is not whitened, enabling the transparency to be maintained. Suitable solvents are methanol, mixtures of water and methanol, and propyl acetate.

The photochemically cured polymer layer and the compliant layer are each suitably applied at dry coverages between 0.10 to 10 g/m$^2$, preferably between 0.55 and 5 g/m$^2$.

The photochemically cured polymer layer and the optional compliant layer are each applied to the transparent support by known coating techniques. They may be dried using conventional techniques.

The polymer layers as described above may be applied to one or both sides of the transparent support.

The orientation layer 20 can be oriented by the following technique. The orientation layer contains a photo-orientable or photo-alignable material and can be oriented by a photo-alignment technique. Photo-orientable materials include, for example, photo isomerization polymers, photo dimerization polymers, and photo decomposition polymers. In a preferred embodiment, the photo-orientable materials are cinnamic acid derivatives as disclosed in U.S. Pat. No. 6,160,597. Such materials may be oriented and simultaneously crosslinked by selective irradiation with linear polarized UV light.

The photo-alignment process may be accomplished by using an apparatus as described in a commonly assigned and cofiled application under U.S. Ser. No. (Attorney Docket No. 84833), the contents of which are incorporated herein by reference.

The anisotropic layer 30 is typically a liquid crystalline monomer when it is first disposed on the orientation layer 20, and is crosslinked by a further UV irradiation, or polymerized by other means such as heat. In a preferred embodiment, the anisotropic layer contains a material such as a diacrylate or diepoxide with positive birefringence as disclosed in U.S. Pat. No. 6,160,597 (Schadt et al) and U.S. Pat. No. 5,602,661 (Schadt et al.) and is cured with UV irradiation using UV wavelength in the range of from 320–400 nm The optic axis in the anisotropic layer 30 is usually tilted relative to the layer plane, and varies across the thickness direction.

The anisotropic layer may also contain addenda such as surfactants, light stabilizers and UV initiators. Surfactants useful in the layer include, but are not limited to: fluorinated surfactants including polymeric fluorochemicals such as fluoro(meth)acrylate polymers; fluorotelomers such as those having the structure $R_fCH_2CH_2OOC$—$C_{17}H_{35}$ or $(R_fCH_2CH_2OOC)_3C_3H_5O$, wherein $R_f$ is $CF_3CF_2(CF_2CF_2)_{x=2\ to\ 4}$, ethoxylated nonionic fluorochemicals such as those having the general structure $R_fCH_2CH_2O(CH_2CH_2O)_xH$, wherein $R_f$ is $CF_3CF_2(CF_2CF_2)_{x=2\ to\ 4}$, and fluorosilcones; silicone surfactants such as polysiloxanes; polyoxyethylene-lauryl ether surfactants; sorbitan laurate; palmitate; and stearates.

Preferred surfactants for use in the present invention are fluorinated surfactants. Such surfactants are preferred due to their effectiveness at very low concentrations and their chemical and thermal stabilities. Particularly preferred fluorinated surfactants are polymeric fluorochemicals, such as fluoro(meth)acrylates, and ethoxylated nonionic fluorochemicals. Non-limiting commercially-available examples of fluoro(meth)acrylates include Zonyl FSG (DuPont) and Modiper F-2020 (NOF Corporation). Non-limiting commercially-available examples of ethoxylated nonionic fluorochemicals include Zonyl FSN and Zonyl FSO (DuPont). UV initiatiors include materials such as benzophenone and acetophenone and their derivatives; benzoin, benzoin ethers, benzil, benzil ketals, fluorenone, xanthanone, alpha and beta naphthyl carbonyl compounds and ketones. Preferred initiators are alpha-hydroxyketones.

The anisotropic layer 30 in accordance with the present invention is conveniently applied from a liquid medium containing an organic solvent mixture that is both miscible with the liquid crystal monomer and has an average boiling point of about 85° C. to about 130° C. The average boiling point is defined as the weighted average boiling point of the solvents contained in the mixture. For organic mixtures having average boiling points of less than about 85° C. the resulting optical ansiotropic layer is highly prone to the formation of coating defects that include mottle, drying convection cells, repellencies, etc. For organic solvent mixtures having boiling points of about greater than 130° C. excessive drying times are required. Preferably the organic solvent mixtures have average boiling points of about 85° C. to 120° C., and more preferably 85° C. to 110° C. The liquid crystal polymer layer may be applied using conventional coating techniques at wet coverages of between about 5 to about 100 cc/m$^2$, preferably between about 10 and about 50 cc/M$^2$. Dry coating weight of the optical ansiotropic layer may range from about 100 to about 10,000 mg/M$^2$, preferably range from about 250 to about 2000 Mg/M$^2$.

The anisotropic layer may also contain a polymeric additive to increase the viscosity of the coating solution used to apply the layer. Such additives are of a relatively high molecular weight so that the average molecular weight is above the entanglement molecular weight of the polymer. Molecular weights above 45,000 are usually suitable for this purpose.

A subbing layer is may be coated on an underlayer or on the transparent support to increase bonding strength between the underlayer or transparent support and the layer coated thereover.

An optional surface activation treatment to the underlayer may be provided before application of the subbing layer. Surface activation treatments include a chemical treatment, a mechanical treatment, a corona discharge treatment, a flame treatment, a UV treatment, a high frequency wave treatment, a glow discharge treatment, an active plasma treatment, or an ozone oxidation treatment.

Examples of known materials for the subbing layer include copolymers derived from vinyl chloride, vinylidene chloride, butadiene, methacrylic acid, acrylic acid, itaconic acid, and maleic anhydride; polyethyleneimine; an epoxy resin; a grafted gelatin; nitrocellulose; halogen-containing resin such as polyvinyl bromide, polyvinyl fluoride, polyvinyl acetate, chlorinated polyethylene, chlorinated polypropylene, brominated polyethylene, chlorinated rubber, vinyl chloride/ethylene copolymer, vinyl chloride/propylene copolymer, vinyl chloride/styrene copolymer, isobutylene chloride containing copolymer, vinyl chloride/vinylidene chloride copolymer, vinyl chloride/styrene/maleic anhydride copolymer, vinyl chloride/styrene/acrylonitrile copolymer, vinyl chloride/butadiene copolymer, vinyl chloride/isoprene copolymer, vinyl chloride/chlorinated propylene copolymer, vinyl chloride/vinylidene chloride/vinyl acetate copolymer, vinyl chloride/acrylic acid ester copolymer, vinyl chloride/maleic acid ester copolymer, vinyl chloride/methacrylic acid ester copolymer, vinyl chloride/acrylonitrile copolymer, internally plasticized poly(vinyl chloride), vinyl chloride/vinyl acetate copolymer, poly(vinylidene chloride), vinylidene chloride/methacrylic acid ester copolymer, vinylidene chloride/acrylonitrile copolymer, vinylidene chloride/acrylic acid ester copolymer, chloroethyl vinyl ether/acrylic acid ester copolymer and polychloroprene; .alpha.-olefin polymers such as polyethylene, polypropylene, polybutene, poly-3-methylbutene and poly-1,2-butadiene; copolymers such as ethylene/propylene copolymer, ethylene/vinyl ether copolymer, ethylene/propylene/1,4-hexadiene copolymer, ethylene/vinyl acetate copolymer, 1-butene/propylene copolymer and butadiene/acrylonitrile copolymer, and blends of these copolymers and halogen-containing resins; acrylic resin such as methylacrylate/acrylonitrile copolymer, ethyl acrylate/styrene copolymer, methyl methacrylate/acrylonitrile copolymer, poly(methyl methacrylate), methyl methacrylate/styrene copolymer, butyl methacrylate/styrene copolymer, polymethyl acrylate, polymethyl .alpha.-chloroacrylate, polymethoxyethyl acrylate, polyglycidylacrylate, polybutyl acrylate, polymethyl acrylate, polyethyl acrylate, acrylic acid/butyl acrylate copolymer, acrylic acid ester/butadiene/styrene copolymer, and methacrylic acid ester/butadiene/styrene copolymer; resins of styrene such as polystyrene, poly-.alpha.-methylstyrene, styrene/dimethylfumarate copolymer, styrene/maleic anhydride copolymer, styrene/butadiene copolymer, styrene/butadiene/acrylonitrile copolymer, poly(2,6-dimethylphenleneoxide) and styrene/acrylonitrile copolymer; polyvinyl carbazole; poly(p-xylylene); polyvinyl formal; polyvinyl acetate; polyvinyl butyral; poll/vinyl phthalate; cellulose triacetate; cellulose butyrate; cellulose phthalate; nylon 6; nylon 66; nylon 12; methoxymethyl-6-nylon; nylon-6, 10-polycapramide; poly-N-butyl-nylon-6-polyethylene sebacate; polybutylene glutarate; polyhexamethylene adipate; polybutylene isophthalate; polyethylene terephthalate; polyethylene adipate; polyethylene adipate terephthalate; polyethylene-2,6-naphthalate; polydiethylene glycol terephthalate; polyethyleneoxybenzoate; bisphenol A isophthalate; polyacrylonitrile; biphenyl A adipate; polyhexamethylene-m-benzenesulfoneamide; polytetramethylene-hexamethylene carbonate; polydimethyl siloxane; polyethylene methylene-bis-4-phenylene carbonate; and bisphenol A polycarbonate (described in, for example, E. H. Immergut "Polymer Handbook", Vol. IV. pages 187–231, Interscience Pub. New York, 1988). Blends of hydrophilic and hydrophobic materials may also be used as in subbing layers. A preferred subbing material is a mixture of cellulose nitrate and gelatin. Examples of materials for the use in this mixture include water soluble polymers, cellulose esters, polymer latex, and a water soluble polyester. Examples of materials for the water soluble polymer include gelatin, gelatin derivatives, casein, agar, sodium alginate, starch, polyvinyl alcohol, an acrylic acid-containing copolymer and a maleic anhydride-containing copolymer. Examples of materials for the cellulose ester include carboxymethylcellulose and hydroxyethylcellulose. Examples of materials for the hydrophobic material include polymer latexes such as vinyl chloride-containing copolymer, a vinylidene chloride-containing copolymer, acrylic acid ester-containing copolymer, vinyl acetate-containing copolymer, and a butadiene-containing copolymer.

The subbing layer may further contain added components such as a surface active agent, an antistatic agent, or a pigment.

The invention may be used in conjunction with electronic imaging device comprising a liquid crystal display device. The energy required to achieve this control is generally much less than that required for the luminescent materials used in other display types such as cathode ray tubes. Accordingly, liquid crystal technology is used for a number of applications, including but not limited to digital watches, calculators, portable computers, electronic games for which light weight, low power consumption and long operating life are important features.

Embodiments of the invention are readily manufactured, do not cause unwanted curl of the support and improve the ability of the orientation layer to align.

The present invention is illustrated in more detail by the following non-limiting examples.

EXAMPLES

Materials

The UV curable lacquer SK3200 was obtained from Sony Chemicals Corporation. CX100 and NeoRez R600 were obtained from NeoResins (a division of Avecia). Sancure 898 was purchased from BFGoodrich. Cymel 300 was obtained from Cytec industries Inc. p-Toluene sulfonic acid (PTSA) was obtained from Sigma-Aldrich. Poly(vinyl alcohol), Airvol 203 was obtained from Air Products. The LPP polymer Staralign 2110 (polyvinyl cinnamate with an alpha-hydroxyketone photoinitiator in methyl ethyl ketone) and the diacrylate nematic liquid crystal (LCP) prepolymer, CB483 (in methyl ethyl ketone) were obtained from Vantico.

Indentation Modulus Measurements

The modulus of the polymer coatings were measured as follows. All samples were conditioned at 73° F./50% RH for at least 18 hours prior to measurement. Following this conditioning period, the load-displacement properties of the materials were determined using a Hysitron nanoindenter equipped with a 2 micron radius, 60° conical diamond indenter. A 150 μN target load and a 10 μN/second loading rate was used in all cases. The data was then analyzed using a modified Oliver and Pharr relationship to calculate a reduced modulus and hardness for each coating.

Tape Peel Test

The propensity of the optical layers to peel away from the barrier layer was tested using standard Scotch tape. The tape was affixed on the center of the coating and peeled rapidly at a 180° angle by hand. The tape was examined for any coating that may have peeled off as a result of a lack of adequate adhesion.

Example 1 (Retarder Film R1 and Compensator Film C1)

(Photochemically Cured Barrier Layer)

A coating solution of the following composition containing SK3200 was coated on 80 micrometer thick triacetyl cellulose to create a barrier layer using an extrusion hopper. The coated layer was dried and crosslinked using UV irradiation at 320 to 400 nm at 365 mj/cm$^2$ to form a transparent barrier layer having a dried weight of 1.7 g/M$^2$.

| | |
|---|---|
| Propyl acetate | 85% |
| SK3200 | 15% |

(Orientation Layer 20)

On top of the crosslinked SK3200 polymer layer a photoalignment layer was coated from the following solution to obtain a dry coverage of 0.076 g/m$^2$. After drying to remove solvents, the sample was exposed to linearly polarized UVB at 308 nm using 10–30 mJ/cm$^2$ light at a 20° angle.

| | |
|---|---|
| Staralign 2110 | 0.48% |
| Methyl ethyl ketone | 31.52% |
| Cyclohexanone | 22.75% |
| n-Propyl acetate | 40.00% |

(Optically Anisotropic Layer 30)

A solution of a diacrylate nematic liquid crystal material, CB483 of the following composition was coated onto the orientation layer to obtain a dry coverage of 0.796 g/m$^2$. After drying, the coated structure was exposed to 400 mJ/cm$^2$ of UVA to crosslink the liquid crystal layer. This resulted in the liquid crystal retarder film R1.

| | |
|---|---|
| LC material CB483 | 8.7% |
| Methyl ethyl ketone | 20.3% |
| Toluene | 62.00% |
| Ethyl acetate | 9.00% |

A second orientation layer 40 identical to layer 20 was coated again over the anistropic layer 30 of the retarder film R1 as described earlier except that the direction of the orientation of 40 was orthogonal to the orientation layer 20. A second anisotropic layer 50 identical to layer 30 was subsequently coated over the orientation layer 40 essentially in the same way as the first anisotropic layer 30 such that 30 was positioned orthogonally relative to the respective optic axis of the anisotropic layer 50 about an axis perpendicular to the plane of the substrate to create a compensator film C1. The inventive sample C1 was evaluated for coating stress cracks visually and the retarder film R1 was evaluated for satisfactory contrast, which is the ability of the retarder film to form a light and dark state when rotated between crossed polarizers with backlighting. The results are shown in Table 1.

Example 2 (Comparison Thermally Cured Barrier Layer)

A coating solution of the following composition containing Cymel 300 was coated on 80 micrometer thick triacetyl cellulose to create a barrier layer using an extrusion hopper. PTSA was used as the acid catalyst to crosslink the Cymel 300 coating. The coated layer was dried and crosslinked at 115° C. to form a transparent barrier layer having a dried weight of 2.15 g/m$^2$.

| | |
|---|---|
| Methanol | 63.36% |
| Butanol | 15.84% |
| Cymel 300 | 20% |
| PTSA | 0.8% |

The optical layers 20, 30, 40 and 50 were coated over the Cymel barrier layer as described in Example 1 to generate a retarder film R2 and a compensator film C2.

Comparison Samples C2 and R2 were then evaluated for coating stress cracks and contrast in the same manner as for Example 1 and the results for all of these examples are shown in Table 1.

TABLE 1

| Example # | Indentation Modulus Of Barrier Layer GPa | Stress cracks in compensator film | Contrast for retarder film |
|---|---|---|---|
| 1 (invention) | 1.7 | C1 - No | R1 - Yes |
| 2 (comparison) | 2.1 | C2 - Yes | R2 - Yes |

No stress cracks were detected in C1, in the optical layers coated over the barrier layer in Example 1, whereas the comparison film C2 showed stress cracks upon coating layers 40 and 50. The structure described in Example 1 is better able than the comparison to withstand any stresses that develop during the drying and curing of the optical layers. The existence of contrast with both barrier layers is believed due to improved efficiency of both to impede the passage of components from the support into the orientation layer coated over it.

Examples 3–7

An 80 micrometer thick triacetyl cellulose was subbed using a coating solution containing 0.71% gelatin and 0.35% cellulose nitrate.

Subbed TAC derived from above was coated with various compliant layers derived from aqueous polyurethanes as described in Table 2. The coated layers were dried at 100° C. to give dried weights as described in Table 2. Over the compliant layers were then coated the SK3200 UV cured layer as described in Example 1 to form a transparent barrier layer having a dried weight of 1.7 g/m².

The orientation and optically anisotropic layers were subsequently coated on the UV cured barrier layer as described in Example 1 to create retarder films and their respective compensator films. The optical films thus produced were evaluated for stress cracks, contrast, and tape peel. The results are shown in Table 2.

axis of the first anisotropic layer about an axis perpendicular to the plane of the substrate. The inventive sample was evaluated visually for optical non-uniformities such as irregularity in thickness and texture (coating mottle) since these irregularities adversely affect desired uniformity of retardation. The inventive film sample was found to exhibit reduced optical non-uniformity resulting for example from orientation and thickness variations, such as mottle, and thus

TABLE 2

| Example | Compliant layer Composition | Dried Weight of compliant layer 70 (g/m²) | Indentation Modulus of barrier* (GPa) | Tape Peel of compensator films♣ |
|---|---|---|---|---|
| 1 (Invention) | None | 0 | 1.7 | 0 |
| 2 (comparision) | None | 0 | 2.1 | – |
| 3 | NeoRez R600 + 3 wt % CX100 | 1.076 | 0.7 | + |
| 4 | NeoRez R600 + 3 wt % CX100 | 2.15 | 0.5 | + |
| 5 | Sancure898 + 10 wt % Airvol203 | 2.36 | 1.6 | + |
| 6 | Sancure898 + 5 wt % Airvol203 + 1 wt % CX100 | 2.15 | 1.6 | + |
| 7 | Sancure898 + 1 wt % CX100 | 2.15 | 1.6 | + |

*Combined compliant layer and UV cured layer
♣0 = little removal, + no removal, – total removal of optical layers As Table 2 shows, the presence of a compliant layer below the photochemically cured barrier polymer (Examples 3–7) improved the tape peel performance of the multilayer structure compared to Example 1. The thermally cured comparison Example 2, on the other hand, exhibited poor tape peel of the optical layers to the barrier layer. Examples 1 and 3–7, all of which had barrier layers whose indentation modulus were less than 2 GPa, exhibited no stress cracks in the multilayer optical structure of the compensator films, unlike Example 2 the barrier layer of which had an indentation modulus greater than 2 GPa. All the retarder films had good contrast.

Example 8

An 80 micrometer thick triacetyl cellulose was subjected to corona discharge treatment 150.6 J/m² (14 J/ft²) and coated with a compliant layer derived from the aqueous polyurethane, Sancure 898, to yield a dried weight of 2.15 g/m². This layer was also crosslinked with 1 weight % CX100 and dried at 100° C. Over the compliant layer was then coated the SK3200 UV cured layer as described in Example 1 to form a transparent barrier layer having a dried weight of 1.7 g/m².

The orientation and optically anisotropic layers, 20 and 30 respectively, were subsequently coated on the UV cured barrier layer as described in Example 1. Another compliant layer and a UV cured barrier layer were next coated as interlayers on the anisotropic layer as described above followed by a second orientation layer identical to layer 20 as described earlier except that the direction of the orientation of the second orientation layer was orthogonal to the orientation layer 20. A second anisotropic layer identical to layer 30 was subsequently coated over the second orientation layer essentially in the same way as the first anisotropic layer such that the optic axis of the second anisotropic layer was positioned orthogonally relative to the respective optic axis of the first anisotropic layer about an axis perpendicular to the plane of the substrate. The inventive sample was evaluated visually for optical non-uniformities such as irregularity in thickness and texture (coating mottle) since these irregularities adversely affect desired uniformity of retardation. The inventive film sample was found to exhibit reduced optical non-uniformity resulting for example from orientation and thickness variations, such as mottle, and thus to be superior in uniformity to a similar film coated without the compliant and barrier layers between layer 30 and the second orientation layer when rotated between crossed polarizers with backlighting.

The entire contents of the patents and other publications referred to in this specification are incorporated herein by reference.

PARTS LIST 5 compensator according to the present invention
6 compensator according to the present invention
7 compensator according to the present invention
10 substrate orientation
20 layer
30 anisotropic layer
40 orientation layer
50 anisotropic layer
60 barrier layer
70 compliant layer
78 plane of substrate (or XY plane)
80 XYZ coordinate system
84 optic axis in the anisotropic layer 30
86 optic axis in the anisotropic layer 50
90 UV light
92 roll moving direction
94 alignment direction\
160 barrier layer
300 compensator according to the present invention
310 moving substrate
320 orientation layer
330 anisotropic layer
350 compensator according to the present invention
500 polarizer
550 polarizer
600 liquid crystal cell 700 liquid crystal display
θ tilt angle
φ azimuthal angle

What is claimed is:

1. An optical compensator for a liquid crystal display comprising a transparent polymeric support bearing an orientation layer and a photochemically cured optically anisotropic layer, in that order, wherein a photochemically cured barrier layer that substantially impedes the passage of components in the support layer from passing into the orientation layer, is present between the orientation layer and the support, and wherein the barrier layer, as disposed on the support, exhibits an indentation modulus of less than 2 GPa.

2. The compensator of claim 1 wherein the dry coverage of the barrier layer is from 0.10–10 g/m$^2$.

3. The compensator of claim 1 wherein the dry coverage of the barrier layer is from 0.55–5 g/m$^2$.

4. The compensator of claim 1 wherein said transparent support comprises a cellulose ester.

5. The compensator of claim 1 wherein said transparent support comprises a polycarbonate.

6. The compensator of claim 1 wherein said optically anisotropic layer comprises a nematic liquid crystal.

7. The compensator of claim 1 wherein the orientation layer contains a material that is capable of orientation by rubbing.

8. The compensator of claim 1 wherein the orientation layer contains materials that are capable of orientation through photoalignment using polarized light.

9. The compensator of claim 1 wherein the orientation layer comprises a polyvinyl cinnamate.

10. The compensator of claim 1 wherein the anisotropic layer contains a nematic liquid crystal material.

11. The compensator of claim 1 wherein the optic axis of the anisotropic layer has a fixed azimuthal angle.

12. The compensator of claim 1 wherein the optic axis of the anisotropic layer has a fixed tilt angle.

13. The compensator of claim 1 wherein the optic axis of the anisotropic layers has a variable tilt angle.

14. The compensator of claim 11 wherein the optic axis of the anisotropic layer has a variable tilt angle.

15. The compensator of claim 1 wherein the optic axis of the anisotropic layer has a variable tilt angle and a variable azimuthal angle.

16. The compensator of claim 1 wherein the anisotropic layers contain a material with positive birefringence.

17. The compensator of claim 1 wherein the transparent polymer support is triacetyl cellulose.

18. The compensator of claim 1 wherein there are present two barrier layers, each of which is adjacent to an orientation layer on the support side.

19. The compensator of claim 1, further comprising a compliant layer between the support and the barrier layer.

20. The compensator of claim 19 wherein the compliant layer has an indentation modulus of less than 2 GPa.

21. The compensator of claim 19 wherein the dry coverage of the compliant layer is from 0.10–10 g/m$^2$.

22. The compensator of claim 19 wherein the dry coverage of the compliant layer is from 0.55–5 g/m$^2$.

23. The compensator of claim 18 further comprising a compliant layer between the support and each of the barrier layers.

24. A liquid crystal display (LCD) comprising the compensator of claim 1.

25. A liquid crystal display (LCD) comprising the compensator of claim 19.

26. An electronic imaging device comprising an LCD of claim 24.

27. An electronic imaging device comprising an LCD of claim 25.

28. A method of forming a component of claim 1 comprising aligning the orientation layer using a photo-alignment step.

29. The compensator of claim 1 comprising a subbing layer.

30. The compensator of claim 29 comprising a subbing layer on the support.

31. A process for forming an optical compensator of claim 1 comprising:
    a) coating and drying the layers in order on the support,
    b) at least partly photochemically curing the barrier layer after the original coating to substantially impede the passage of components in the support layer from passing into the subsequently applied orientation layer;
    c) coating an orientation layer comprising a photo-alignable polymer in a solvent over the barrier layer;
    d) drying the orientation layer;
    e) photo-aligning the orientation layer in a predetermined direction;
    f) coating an anisotropic nematic liquid crystal layer comprising a polymerizable material in a solvent carrier over the orientation layer;
    g) drying the anisotropic layer;
    h) photochemically curing the anisotropic layer; and
    i) repeating the above steps c) through h) coating over the anisotropic layer obtained from h) but photo-aligning the orientation layer at a predetermined angle to the direction in step e);
    provided that the photochemical curing steps, in toto, are sufficient so that the final photochemically cured barrier layer as disposed on the support has an indentation modulus of less than 2 GPa.

32. The process of claim 31 wherein the predetermined angle of step i) to the angle in step e) is 90°.

33. The process of claim 31 wherein the photochemically curable polymer in the barrier layer is coated from a dipersion or solution containing water, an alcohol, a hydrocarbon, an alkyl halide, ester, ketone, or ether.

34. The process of claim 31 wherein the photo-exposure conditions used to cure the optically anisotropic layer are UV light of wavelength from 280 to 420 nm.

35. The process of claim 31 wherein the photo-exposure conditions used to cure the optically anisotropic layer are UV light of wavelength from 320 to 410 nm.

36. A method of forming a compensator of claim 1 comprising coating a compliant layer having a GPa less than that of the barrier layer prior to coating the barrier layer.

37. The method of claim 36 wherein the compliant layer contains a polyurethane.

38. The method of claim 36 wherein the compliant layer is coated from an aqueous dispersion.

39. The method of claim 36 comprising coating a subbing layer.

40. The method of claim 39 wherein surface activation treatment is applied to the underlayer before coating the subbing layer.

* * * * *